Figure 1:
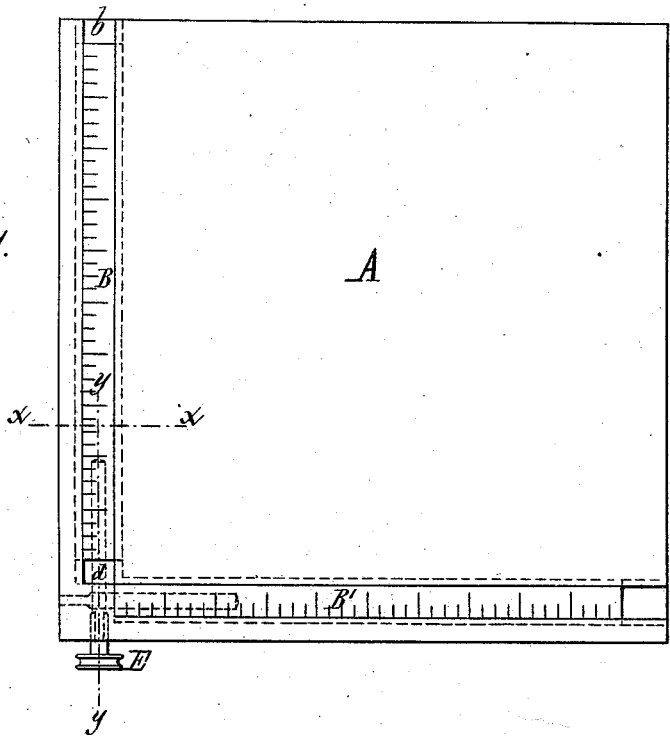

J. N. SCATCHERD.
DRAWING-BOARD.

No. 173,502. Patented Feb. 15, 1876.

Witnesses:
Edward Wilhelm
Chas. J. Buchheit

James N. Scatcherd, Inventor
By Jay Hyatt, Atty.

N. PETERS, PHOTO-LITHOGRAPHER, WASHINGTON, D. C.

UNITED STATES PATENT OFFICE.

JAMES N. SCATCHERD, OF BUFFALO, NEW YORK.

IMPROVEMENT IN DRAWING-BOARDS.

Specification forming part of Letters Patent No. 173,502, dated February 15, 1876; application filed December 23, 1875.

*To all whom it may concern:*

Be it known that I, JAMES N. SCATCHERD, of the city of Buffalo, in the county of Erie and State of New York, have invented certain Improvements in Drawing Boards and Squares, which improvements are fully set forth in the following specification, reference being had to the accompanying drawing:

The first part of my invention relates to that class of drawing-boards which are provided with one or more inlaid rules or scales arranged flush with the surface thereof, so that the measurements may be drawn with the T-square directly from said rules or scales without requiring the use of the dividers for the purpose.

The first part of my invention consists in arranging these rules or scales in a dovetail or similar groove in the drawing-board and making the same longitudinally adjustable therein, as will be hereinafter more fully described. The second part of my invention consists of the combination, in a drafting apparatus, of a board provided with one or more adjustable scales of a T-square provided with one or more scales on its upper surface, so that measurements in the direction of the T-square may be drawn with reference to the lines drawn from the drawing-board scale without the use of dividers, as will be hereinafter more fully set forth.

Figure 2:
Figure 3:
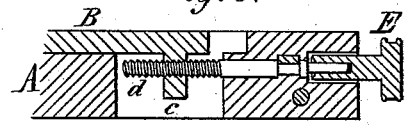
Figure 4:
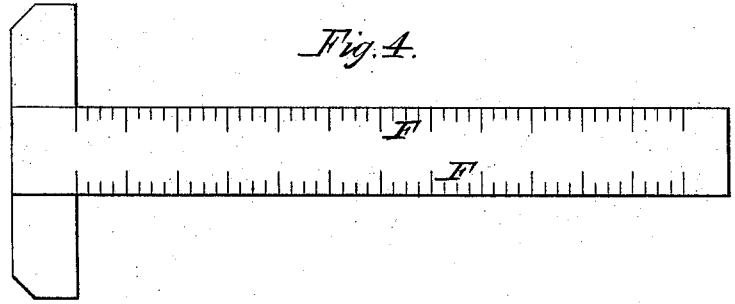

In the accompanying drawing, Figure 1 is a plan view of a drawing-board provided with my improvements. Figs. 2 and 3 are fragmentary sectional views on an enlarged scale in lines $x\ x$ and $y\ y$, respectively. Fig. 4 represents my improved T-square.

Like letters of reference refer to like parts in each of the figures.

A represents the drawing-board; B, a rule or scale arranged near one of the edges thereof and parallel therewith, its upper side being flush with the surface of the board. The rule or scale B is arranged in a dovetail recess or groove, $b$, in the board, so as to be longitudinally adjustable therein; $c$ is a lug secured to the under side of the scale B near one of its ends, and $d$ a set-screw held against longitudinal movement in the board A and engaging in the threaded hole of the lug $c$, so that by turning the screw $d$ the scale B is adjusted forward or backward as may be desired. The outer end of the set-screw may be made square, so as to fit in the opening of a detachable key or wrench, E, as shown in drawing. B' is a scale similar to that shown at B, and arranged at right angles therewith, and made adjustable in the drawing-board in the same manner. By adjusting the scale B, the starting-point or any other desired point of the scale can be made to coincide with the base or starting-line of the plan to be drawn, and if several principal lines are contained in the plan from which the inner parts are laid out, a prominent mark on the scale can be readily made to correspond with any of the principal lines of the plan, thereby facilitating the drawing of intermediate lines. The same advantage is obtained by the adjustable scale when two or more figures are to be drawn on the same sheet, in which case the starting-lines of each figure can be drawn wherever it is most convenient, and the scale adjusted to these starting-lines.

In Fig. 4 is represented the square designed for use with my improved drawing-board, provided on its surface with one or more scales or rules, F, so that by starting from a given point a line of definite length can be drawn without taking off the length by means of the dividers, thereby greatly simplifying the operation. The T-square is especially convenient when used in connection with my improved drawing-board, as the measurements in one direction can be taken from one of the adjustable scales and at right angles to that direction from the T-square.

I am aware that rules or scales have been described on or inlaid in drawing-boards, and this I do not broadly claim; but

What I claim as my invention is—

1. The combination, with a drawing-board, of one or more scales or rules arranged in grooves in the drawing-board and made longitudinally adjustable therein, substantially as and for the purpose hereinbefore set forth.

2. In a drafting apparatus, the combination, with a drawing-board provided with one or more adjustable scales or measures, of a T-square, provided on its upper surface with one or more rules or scales arranged parallel with its edges, substantially as and for the purpose hereinbefore set forth.

JAMES N. SCATCHERD.

Witnesses:
EDWARD WILHELM,
CHARLES J. BUCHHEIT.